Dec. 18, 1962  J. A. LAUCK  3,068,795
HYDRAULIC POWER SYSTEM
Filed Oct. 18, 1956  3 Sheets-Sheet 1

Inventor:
John A. Lauck
By: Alonzo B. Kight
Atty.

United States Patent Office 3,068,795
Patented Dec. 18, 1962

3,068,795
HYDRAULIC POWER SYSTEM
John A. Lauck, Shaker Heights, Ohio, assignor to Borg-Warner Corporation, Chicago, Ill., a corporation of Illinois
Filed Oct. 18, 1956, Ser. No. 616,881
2 Claims. (Cl. 103—11)

This invention relates to a hydraulic power system and more particularly to a hydraulic system utilizing one or more pumps incorporating pressure loadable bushings together with means for controlling pressure loading of the bushings.

In providing a hydraulic power system for use as a hydraulic transmission for a vehicle, several problems have been encountered. First, where speed ratio shifting is incorporated by selectively utilizing the output from two or more pumps to vary the flow and pressure to a hydraulic motor, the transmission operates part of the time from the output of only one pump, so that the means for cutting out the operation of the other pump is an important factor in determining efficiency. Second, it is desirable that the transmission effect the shift between the speed ratios normally in response to changes in vehicle speed. Third, it is important to provide means for overriding the speed responsive control to prevent undue shuttling between various speed ratios when abnormal torque conditions are encountered such as when the vehicle is climbing a steep hill. Fourth, and further in the interest of economy of operation, control means must be provided which will not cause excessive power losses at high vehicle speed. Fifth, it is desirable to incorporate means for preventing free wheeling of the vehicle when the accelerator is released, in order that the engine may be used as a brake.

When providing a hydraulic power system utilized to achieve low torque starting of a hydraulic pump assembly driven by an electric motor or the like, several problems are encountered which are similar to those encountered with a hydraulic transmission. First, it is desirable to provide for successive increases in pump output as the speed of rotation of the pump assembly constituting one or more pumps in parallel, is increased in order to apply as low a starting load as possible upon the motor driving the pump assembly so that the motor can be of lower capacity. This feature is especially important when operating at sub-zero temperatures where the increased viscosity of the fluid greatly impairs starting. Second, it is very desirable to provide means for cutting out the output of one or more of the pumps when a low flow is sufficient for operating the utilization means. Third, it is important to incorporate means for overriding the speed responsive control to cut out the output of one or more of the pumps when a high pressure is required by the utilization means. Fourth, in order to provide for simplicity of operation, all of the various controls must operate automatically.

When providing a hydraulic power system or transmission for certain types of vehicles, such for example, fork lift trucks or the like, several problems are encountered. First, it is desirable to provide for maximum pump output under no load starting conditions, thereby providing high speed operation of the truck in traveling from place to place. Second, it is desirable to provide for successive decreases in pump output and low speed as the torque requirements on the system increase, thereby providing more power for handling loads, this feature also being especially important for ease of directional control and for creeping control while maneuvering when the load being handled is relatively heavy. Third, it is very desirable to provide means for cutting out the output of one or more of the pumps when the low flow, high pressure output is required for increased efficiency. Fourth, in order to provide for simplicity of operation, the various necessary controls should operate automatically in response to the torque requirements.

In general, the present invention is concerned with means for providing controlled hydraulic power wherein the output from one or more pumps is controlled in accordance with the flow and pressure requirements of a utilization means and in accordance with the speed of operation of the pump or pumps or the torque requirements of the utilization means. According to this invention, a main pump or pumps are provided having pressure loadable bushings, such as shown in Lauck et al. Patent No. 2,420,622, adapted for maintaining a proper pumping seal when the output pressures of the pump or pumps are exerted behind the bushings and having control valve means for selectively relieving the pressures behind the bushings. A control or pilot pump is connected for rotation with the main pump or pumps, with the output pressure from this smaller pump being utilized for actuating the control valve to cause pressure loading or unloading of the bushings of a larger output pump in accordance with the speed of rotation of the smaller pump or in accordance with the torque requirements of the utilization means.

One embodiment of the invention disclosed in this application utilizes the above broad concept, together with other features, in a hydraulic transmission system for a vehicle, another embodiment of the invention utilizes this broad concept for effecting low torque starting of a hydraulic pump driven by an electric motor or the like, and another embodiment of the invention utilizes this broad concept in a hydraulic transmission for a lift truck or the like.

It is an object of the present invention to provide an improved hydraulic power system.

Another object of the invention is to provide an improved hydraulic system utilizing hydraulic pumps with pressure loadable bushings, together with means for selectively loading and unloading the pressure exerted behind the bushings normally in accordance with the speed of operation of the pumps.

Another object of the invention is to provide an improved hydraulic system utilizing hydraulic pumps with pressure loadable bushings, together with means for selectively loading and unloading the pressure exerted behind the bushings in accordance with the torque requirements of the system.

A further object of the invention is to provide a hydraulic power system utilizing one or more main pumps with pressure loadable bushings and a control or pilot pump for actuating a control valve controlling the pressure behind the bushings of the main pump or pumps normally in accordance with the speed of rotation of the pumps.

A still further object of the invention is to provide a hydraulic power system utilizing one or more main pumps with pressure loadable bushings and a control or pilot pump for actuating a control valve controlling the pressure behind the bushings of the main pump or pumps in accordance with the torque requirements of the system.

Still another object of the present invention is to provide an improved hydraulic power system which can be incorporated in a hydraulic transmission for driving a vehicle.

A still further object of the invention is to provide an improved hydraulic power system which can be utilized to achieve low torque starting of a hydraulic pump in order to permit the use of a smaller motor for driving the pump.

Another and still further object of the invention is to provide an improved hydraulic power system which can be utilized to provide high output of a hydraulic pump with a subsequent decrease in output and an increase in pressure depending upon the torque requirements of the system.

In accordance with one hydraulic transmission embodiment of the present invention, it is a specific object to provide two or more positive displacement pumps incorporating pressure loadable bushings with the output of the pumps being utilized for driving one or more hydraulic motors, together with efficient control means for controlling pressure loading of the bushings relative to the speed of rotation of the pumps and the pressure and flow requirements of the motors.

In accordance with another hydraulic transmission embodiment of the present invention, it is a specific object to provide two or more positive displacement pumps incorporating pressure loading bushings with the output of the pumps being utilized for driving one or more hydraulic motors, together with efficient control means for controlling pressure loading of the bushings in accordance with the torque requirements of the transmission.

In accordance with the low torque starting embodiment of the invention, it is a specific object to provide efficient control means for achieving low torque starting of one or more positive displacement pumps arranged in parallel by providing for unloading of the pressure loadable bushings of the pump or pumps until a predetermined speed of rotation has been reached.

Other objects, features and advantages of the present invention will be apparent from the following detailed description of two embodiments, by way of preferred examples only, taken in conjunction with the accompanying drawings, in which:

FIG. 7 is a schematic, partially sectional view of still another embodiment of the invention as incorporated in a hydraulic transmission for a vehicle, such as a fork lift truck or the like.

The first embodiment of the invention, as illustrated in FIGS. 1–5, includes generally a hydraulic power supply or pump assembly P, pressure fluid utilization means in the form of a fluid motor M, control means A, selector means B, free-wheeling inhibitor means C, control pressure relief means D, maximum pressure relief means R, and torque sensing, control overriding means T. The pressure supply means includes a first pump P–1 with pressure loadable bushings connected in parallel with a second pump P–2 with pressure loadable bushings, the pump P–2 being of larger capacity than the pump P–1. The capacity of the pressure fluid supply P is controlled by selectively loading and unloading the pumping seal bushings of the pumps P–1 and P–2 by means of the control means A in accordance with the speed of rotation of a pilot pump P–3, which is of considerably smaller capacity than either of the pumps P–1 and P–2 and is connected for being driven at a fixed ratio with respect to these pumps. The pressure fluid output of the supply means P is manifolded and conducted through the motor M in a direction controlled by the position of the selector means B in order to effect either forward or reverse drive of a motor vehicle or the like which has its drive wheels (not shown) coupled to the motor M. The output from the pilot pump P–3 is by-passed back to the fluid reservoir or sump (not shown) in order to prevent excessive power losses after the control means A have caused pressure loading of the bushings of both of the pumps P–1 and P–2 so that the pressure fluid supply P is operating at maximum capacity. If the motor M encounters an unusual load, such as when the vehicle is travelling up a steep incline, or when the vehicle engine power is suddenly increased, the torque sensing means T acts to override the control means A to lower the flow capacity of the pressure fluid supply means P by unloading the pumping seal bushings of one of the pumps P–1 or P–2, depending upon the magnitude of the excessive load.

The arrangement is such that a first relatively low speed ratio is provided between the speed of rotation of the motor M as compared with the speed of rotation of the pumps when only the bushings of the small capacity pump P–1 are pressure loaded in accordance with a relatively low speed of rotation of the pilot pump P–3. When a somewhat higher speed of rotation of the pilot pump P–3 is reached, the control means A pressure load the bushings of the larger capacity pump P–2 and unload the bushings of the pump P–1 to provide an intermediate speed ratio between the motor M and the pumps. After a higher vehicle speed and a consequently higher speed of rotation of the pilot pump P–3 has been reached, the bushings of both the pumps P–1 and P–2 are loaded by the control means A so that the pressure fluid supply P is operating at maximum flow capacity and the vehicle is operating in high speed ratio. The torque responsive means T operate only in an abnormal condition to override the control means A to cause a downshift to a lower speed ratio, or to prevent an upshift until a relatively higher vehicle speed has been reached.

The free-wheeling inhibitor C operates when the vehicle is travelling in the forward direction to choke off the return flow from the motor M when the vehicle accelerator is suddenly released in order to prevent free-wheeling of the fluid motor and the vehicle.

The maximum pressure relief means R act to vent excessive pressures in the system back to the sump.

Figure 1:
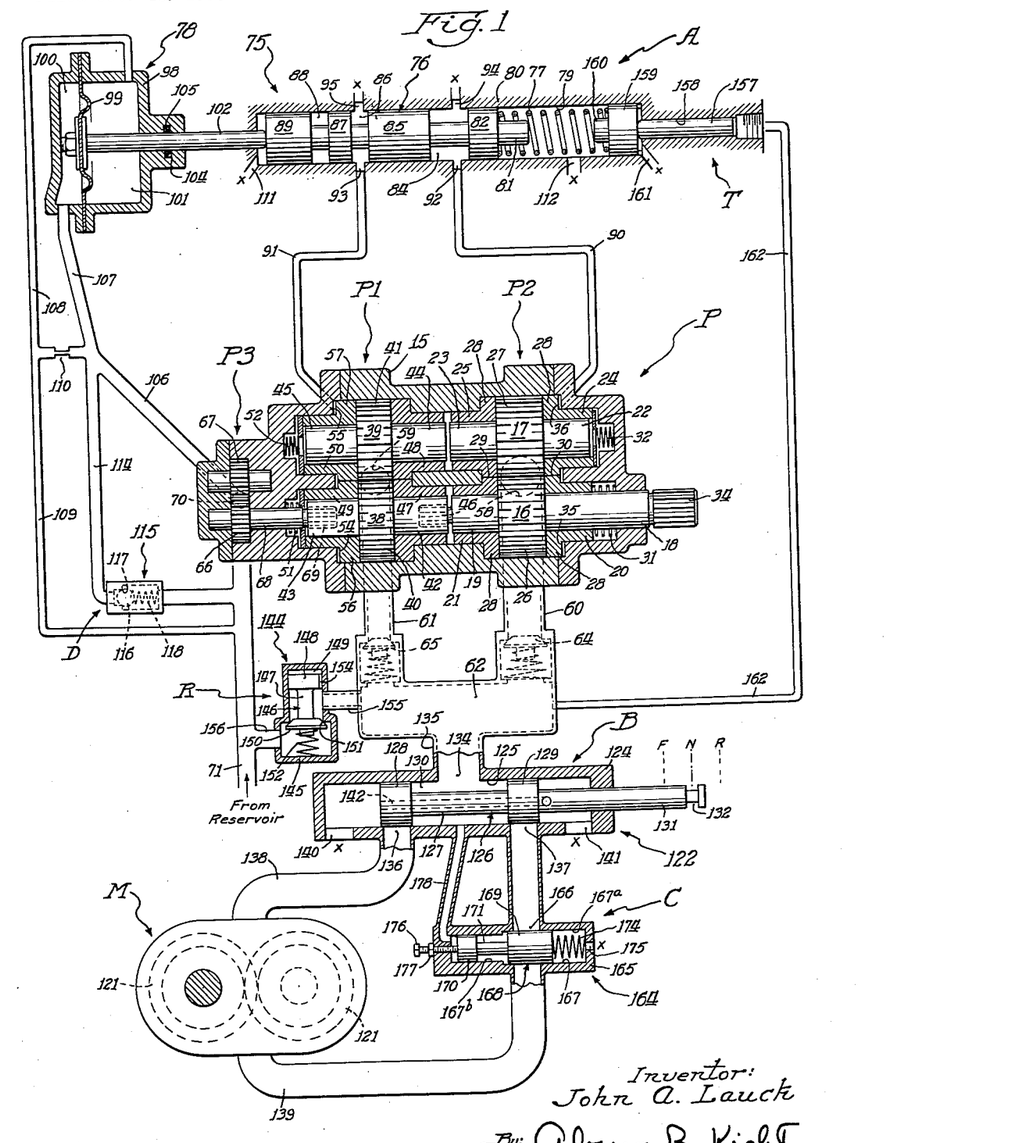
FIG. 1 is a schematic, partially sectional view of one embodiment of a hydraulic power system according to the present invention as incorporated in a hydraulic transmission for a vehicle.

In this first embodiment of the invention, the hydraulic power supply or pump assembly P includes a housing or casing 15 which contains the pumps P–1, P–2 and P–3. The pumps are all coupled for a common drive, but it will be readily apparent that any fixed ratio drive may be provided between the pumps by means of gearing (not shown). For example, the pilot pump P–3 may be coupled for being driven at a considerably greater speed than either of the pumps P–1 and P–2 in order to increase the sensitivity of control. The pumps P–1 and P–2 are of the pressure loading type as shown in the above cited Lauck et al Patent No. 2,420,622.

The large displacement pump P–2 is provided with a drive gear 16 and a meshing driven gear 17. The gear 16 is provided with a pair of axially extending hubs 18 and 19 about which are disposed in closely conforming relation a movable pumping seal bushing 20 and a stationary pumping seal bushing 21 respectively. The gear 17 is provided with a pair of axially extending hubs 22 and 23 about which are disposed in closely conforming relation a movable pumping seal bushing 24 and a stationary pumping seal bushing 25, respectively. Between the respective hubs the gears 16 and 17 are provided with pump gear teeth 26 and 27, respectively, adapted for meshing in a complementary manner. The bushings are provided with generally annular flanges 28 adapted for engaging the side faces of the gear teeth 26 and 27 to provide a pumping seal when the gears are rotated.

The stationary bushings 21 and 25 and the movable bushings 20 and 24 are provided with respective flat engagement surfaces 29 and 30 in the area of interengagement of the gear teeth. The movable bushings 20 and 24 are resiliently urged against the side faces of the respective gear teeth 26 and 27 by means of lightly loaded compression springs 31 and 32, respectively, in order to provide an initial pumping seal about the gear teeth. The pump P-2 may be adapted for being driven in any suitable manner such as through a shaft portion 34 of the hub 18 which extends out of the casing 15 and is adapted for being coupled to a source of power such as an internal combustion engine (not shown).

In order to provide graduated force for urging the movable bushings 20 and 24 of the gear pump P-2 into pumping seal relation in accordance with the output pressure of the pump, a pair of generally annular, interconnected pressure loading chambers 35 and 36 are provided adjacent the outward faces of the respective flanges 28, and these pressure loading chambers are connected in a suitable manner (not shown) with the outlet side of the pump. Hence, the pumping seal force exerted on the opposite side faces of the respective gear teeth 26 and 27 is graduated in accordance with the output pressure of the pump P-2 in the manner explained in detail in the above cited Lauck et al. patent.

The gear pump P-1 is constructed in a manner similar to the gear pump P-2 and includes a drive gear 38 and a driven gear 39 provided with respective meshable gear teeth 40 and 41. The gear 38 is provided with axially oppositely extending hubs 42 and 43 while the gear 39 is provided with axially oppositely extending hubs 44 and 45. The hub 42 of the gear 38 is coupled to the hub 19 of the drive gear 16 of the pump P-2 by means of a splined connection 46. In the manner described in accordance with the gear pump P-2, the pump P-1 is provided with stationary pumping seal bushings 47 and 48 disposed in closely conforming relation about the respective hubs 42 and 44 and is further provided with a pair of movable pumping seal bushings 49 and 50 disposed in closely conforming relation about respective hubs 43 and 45. The movable bushings 49 and 50 are urged into initial pumping seal engagement with the side faces of the gear teeth by means of respective lightly loaded compression springs 51 and 52. A pair of interconnected pressure loading chambers 54 and 55 are provided adjacent the respective outward faces of generally annular pumping seal flanges 56 and 57 of the bushings 49 and 50. The pressure loading chambers are connected in a suitable manner (not shown) with the outlet side of the pump P-1, and this pump operates in a manner identical to the operation of the pump P-2.

The housing 15 is provided with outlet ports 58 and 59 connected to the outlet side of the pumps P-2 and P-1, respectively. The outlet ports 58 and 59 are connected by means of respective passages 60 and 61 to a manifold 62. Lightly loaded spring-urged check valves 64 and 65 are provided in the passages 60 and 61 to permit flow from the pumps into the manifold 62 but to prevent reverse flow from the manifold back to the pumps.

The pilot pump P-3 includes a pair of intermeshing pump gears 66 and 67 with the gear 66 having a hub 68 which is coupled for being driven at a fixed ratio from the hub 43 of the gear 38, the ratio in the present instance being a direct drive provided by means of a splined connection 69. An outlet port 70 is provided in the casing 15 for the pilot pump P-3.

Working fluid, such as hydraulic oil, for all of the pumps is provided from a sump or reservoir (not shown) by means of a supply conduit 71 which is connected to the inlet sides of the respective pumps in any suitable manner through inlet ports (not shown) formed in the casing 15.

In this embodiment of the invention, the control means A for controlling pressure loading of the bushings of the pumps P-2 and P-1 include a control or governor valve 75. The governor valve 75 includes generally a governor spool 76 which is resiliently urged toward the left by means of a compression spring 77 to cause a shift to a lower speed ratio by lowering the capacity of the pressure fluid supply P. The control means A also include a differential pressure biasing mechanism 78 adapted for urging the spool 76 toward the right in accordance with the speed of rotation of the pilot pump P-3 in a manner to be explained in order to cause a shift to a higher speed ratio by increasing the capacity of the fluid supply P. The spool 76 is shiftably mounted in a bore 79 of a casing or housing portion 80 which may comprise a portion of the pump housing 15. The spool 76 is provided at its right end with a reduced diameter portion 81, the right end of which serves as a stop for limiting the movement of the spool in its rightward travel. An enlarged portion or land 82 is formed on the spool 76 adjacent the portion 81 and has its outward surface fitted in valving relation with the wall of the bore 79. The compression spring 77 bears against the right face of the land 82 for urging the spool 76 toward the left. A groove 84 is provided between the land 82 and a second, longer land 85 disposed to the left of the land 82 and having its outward surface fitted in of the land 82 and having its outward surface fitted in valving engagement with the wall of the bore 79. A relatively narrow groove 86 is provided between the land 85 and a relatively short land 87 located to the left of the land 85 and having its outer surface fitted in valving relation with the wall of the bore 79. Another narrow groove 88 is provided between the land 87 and another land 89 is formed at the left end of the spool 76 and having its outer surface fitted in valving engagement with the wall of the bore 79.

In order to enable pressure loading of the bushings of pumps P-1 and P-2, the pressure loading chambers 36 and 55 are connected by means of passages 90 and 91 to respective inlet ports 92 and 93 communicating in axially spaced positions with the valve bore 79. Outlet ports 94 and 95 are disposed radially oppositely to the ports 92 and 93, respectively, and are adapted to communicate therewith when not blocked by the respective lands of the governor spool 76. The outlet ports 94 and 95 communicate with the sump by means of passages not shown. When the valve spool 76 is in the initial position shown in FIG. 1, the port 92 communicates with the port 94 through the groove 84, and the port 93 communicates with the port 95 through the groove 86, so that the pressure loading chambers of the pumps P-2 and P-1 are relieved to the sump. Hence, the pumps are unloaded and initial pressure generated by rotation of the pumps causes the movable bushings to move away from the gear side faces to allow communication between the inlet and outlet sides of the pumps. When the bushings are unloaded, the slight pressure generated is insufficient to unseat the check valves 64 and 65 so that no pressure is transmitted to the manifold 62.

For causing selective loading of the bushings of the pumps P-2 and P-1 in accordance with the speed of rotation of the pumps the pilot pump P-3 and the biasing mechanism 78 are provided. The biasing mechanism 78 comprises a casing 98 having a flexible diaphragm 99 disposed therein with its outer peripheral portion secured between opposite halves of the casing 98 to divide a chamber therein into a first pressure chamber 100 and a second pressure chamber 101. The central portion of the diaphragm 99 is fixedly secured to a compression link 102 which extends axially outwardly of the casing 98 and into the bore 79 with its right end abutting the left end of the governor spool 76. The left end of the compression link 102 serves as a stop in conjunction with the end wall of the chamber 100 to allow the compression spring 77 to hold the governor spool 76 in the initial position as shown in FIG. 1. An O-ring 104 is disposed in an annular groove 105 formed in a portion of the casing 98 about the compression link 102 to provide a pressure seal while permitting axial shifting of the link.

The outlet port 70 of the pilot pump P–3 is connected to the first pressure chamber 100 by means of a conduit 106 and a branch conduit 107. The conduit 106 is also connected to the second pressure chamber 101 by means of a branch conduit 108. The branch conduit 108 is also connected to the sump return conduit 71 by means of another branch conduit 109.

For acting in conjunction with the biasing mechanism 78 and the pilot pump P–3, a restriction in the form of an orifice 110 is disposed between the conduits 106 and 108. Since the pressure upstream of the orifice 110 is referred to the first pressure chamber 100 and the pressure downstream of the orifice is referred to the second pressure chamber 101, the pressure differential across the diaphragm assembly 99 will be substantially equal to the pressure drop across the orifice 110, so that this diaphragm pressure differential will vary directly with the square of the rate of flow through the orifice. Hence, since the pilot pump P–3 is a positive displacement pump, the diaphragm pressure differential will vary as the square of the speed of rotation of the pump.

It will be noted that this diaphragm pressure differential tends to urge the governor spool 76 toward the right through the compression link 102 in opposition to the bias of the compression spring 77, so that the position of the governor spool 76 is responsive to the speed of rotation of the pump P–3 in accordance with a balance between the pressure differential force exerted by the diaphragm 99 through the link 102 and the spring compressive force exerted by the spring 77, a greater speed of rotation of the pump resulting in a greater displacement of the governor spool 76 toward the right.

In order to prevent hydraulic blocking, which could interfere with the shifting of the governor spool 76, vent ports 111 and 112, connected to the sump by passages not shown, communicate respectively with the left end of the bore 79 and the portion of the bore 79 containing the compression spring 77.

Figures 2, 3, 4, 5, 6:
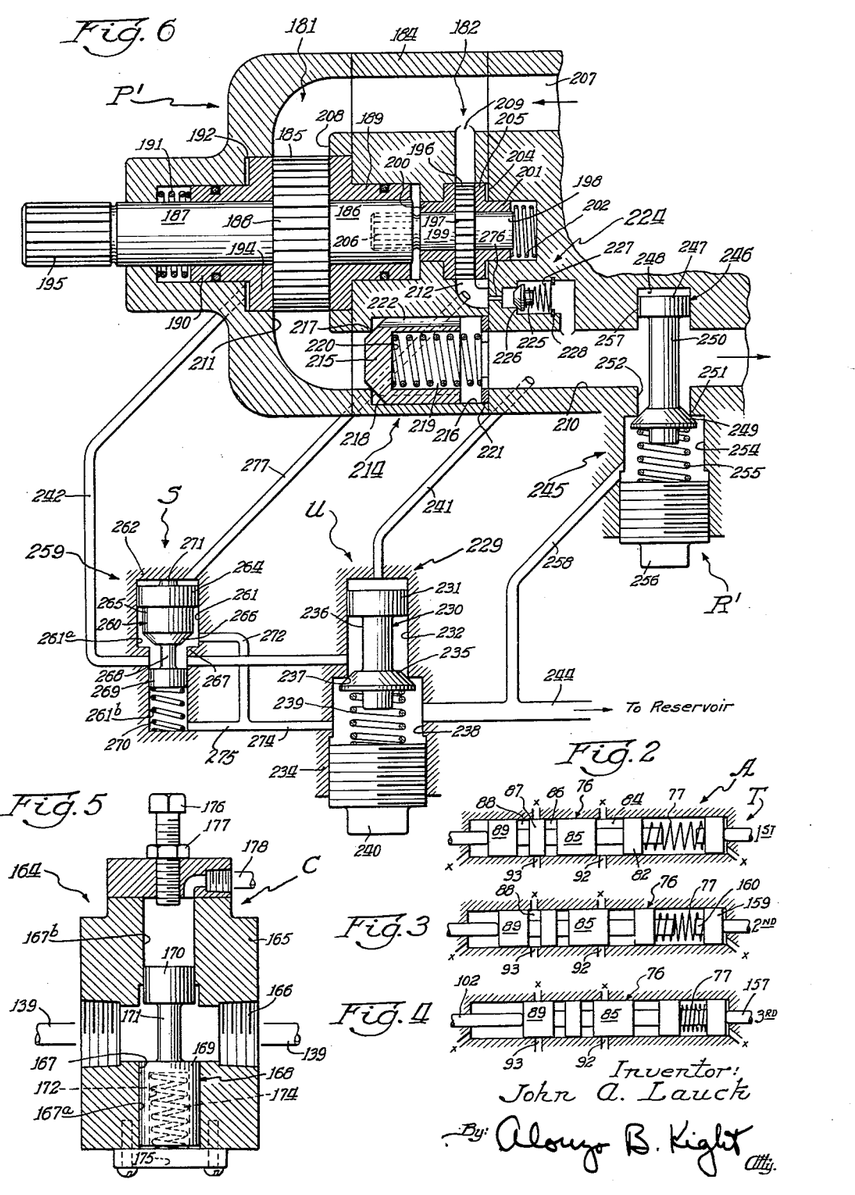
FIG. 2 is a reduced size, schematic, partially sectional view of the control valve means of FIG. 1 and showing the control valve in first speed position.
FIG. 3 is a reduced size, schematic, partially sectional view of the control valve means of FIG. 1 showing the control valve in the second speed position.
FIG. 4 is a reduced size, schematic, partially sectional view of the control valve means of FIG. 1 showing the control valve in the third speed position.
FIG. 5 is an enlarged, sectional view of a choke valve arrangement utilized in the embodiment shown in FIG. 1.
FIG. 6 is a schematic, partially sectional view of another embodiment of the invention wherein low torque starting of the main pump is provided.

For cutting down on the power loss occasioned by operation of the governor pump P–3 at high speeds, a by-pass passage 114 communicates between the conduit 106 and the sump conduit 71. The control pressure relief means D are provided in the form of a pressure relief valve 115 which is disposed in the conduit 114 and may comprise a ball check member 116 resiliently urged into closing relation with a port 117 by means of a compression spring 118. The construction and arrangement of the relief valve 115 is such that it will remain closed until the pressure drop across the orifice 110 is sufficiently high to move the governor spool 76 into its extreme right hand position as shown in FIG. 4, and at this time the valve will open to by-pass the output of the pump P–3 around the orifice 109 to prevent any additional increase in pressure differential for substantially cutting down on the power loss occasioned by operation of the pilot pump P–3 at higher speeds.

Hydraulic power utilization means for use with this embodiment of the invention may comprise one or more hydraulic motors such as the hydraulic motor M which includes a pair of meshing gears 121, 121. When the system is utilized for driving a vehicle, one of the gears 121 is coupled to the vehicle driving wheels. It will be readily apparent that two motors M could be just as easily provided for connecting to two separate driving wheels.

Control of fluid flow from the pumps P–2 and P–1 through the manifold 62 is accomplished by the selector valve means B in the form of a four-way selector valve 122. The selector valve 122 comprises a housing 124 having a bore 125 therein containing a shiftable selector spool 126. The selector spool 126 has a central reduced diameter stem portion 127 with an enlarged land 128 at its left end and an enlarged land 129 at its right end, thus providing an annular groove 130 between the lands.

An axially extending portion 131 of the selector spool 126 extends out of the housing 124 and is provided with an end groove 132 which may be connected to actuating linkage (not shown) under the control of the vehicle operator. The selector valve 122 is provided with a central port 134 which communicates at all times with the groove 130 and which is connected to the manifold 62 by means of a duct 135. A pair of outlet ports 136 and 137 communicate with the bore 125 in axially spaced positions and are adapted for being blocked by the respective lands 128 and 129 when the selector spool 126 is in neutral position as shown in FIG. 1. The outlet port 136 is connected to one side of the motor M by means of a conduit 138, and the outlet port 137 is connected to the other side of the motor M by means of a conduit 139. The left end portion of the bore 125 communicates with the sump through a sump return port 140 and a connecting conduit (not shown). The right end portion of the bore 125 communicates with the sump by means of a sump return port 141 and a connecting conduit (not shown). An interconnect passage 142 is formed axially through the stem 127 and the lands 128 and 129 to interconnect the opposite end portions of the bore 125 to permit easier shifting of the selector valve. When the selector valve spool 126 is in its left hand position marked "F," the duct 138 communicates with the manifold 62 and the transmission is conditioned for forward drive with the duct 139 acting as a return duct to the sump through the ports 137 and 141. When the selector valve spool 126 is in its right hand position indicated as "R" the transmission is conditioned for driving the vehicle in a reverse direction with the duct 139 acting as the inlet to the motor M to rotate the same in a reverse direction.

The maximum pressure limiting means R are provided in the form of a maximum pressure relief valve 144 which is arranged for preventing the generation of an excess pressure in the manifold 62 during a condition, for example, such as fast idle engine warm-up of the vehicle engine with the selector valve 122 in the neutral position, in which condition the pressure loadable bushings of one or more of the pumps P–2 or P–1 may be loaded due to operation of the pumps at a speed greater than the normal idle speed. The relief valve 144 may be of the nonchattering type as shown in Holt Patent No. 2,351,512 and includes a housing 145 containing a shiftable valve spool 146. The spool 146 comprises a reduced diameter stem portion 147, an integral land portion 148 formed at its upper end and disposed in a dash pot 149, and a mushroom valve portion 150 formed at its lower end and adapted to close an outlet port 151 under the urging of a fairly heavy compression spring 152. It will be noted that a restricted clearance 154 is provided between the side wall of the land 148 and the wall of the dash pot 149 so that the pressure on both sides of the land will be the same but movement of the valve spool 146 will be damped to prevent chattering of the valve due to the flow restriction provided by the clearance 154. The portion of the casing 145 between the land 148 and the valve portion 150 is connected to the manifold 62 by means of a duct 155, while the portion of the casing below the valve portion 150 communicates with the sump conduit 71 by means of a duct 156. It will be seen that when the pressure in the conduit 62 tends to reach an excessive, dangerous value, the pressure will cause opening of the valve 150 against the bias of the relatively strong spring 152 to vent the pressure back to the sump.

The torque sensing mechanism T is incorporated in order to render the operation of the governor valve 75 responsive to vehicle torque requirements as well as vehicle speed. Herein such mechanism comprises a torque sensing piston 157 which is disposed in conforming relation in a reduced diameter axially extending bore 158 formed at the right end of the bore 79 in the governor valve housing 80. The left end of the piston 157 abuts a spring seat member 159 against which is seated the right end of the compression spring 77. A stop lug 160 is formed on the member 159 and is adapted to engage the stop member 81 of the governor spool 76 when the spool is in its extreme right hand position as shown in FIG. 4. The portion of the bore 79 between the member 159 and the right hand of the bore is vented to the sump by means of a vent port 161 and a conduit (not shown) in order to prevent hydraulic blocking of shifting of the member 159. The right end of the torque piston 157 is referenced to the pressure in the manifold 62 by means of reference passage 162. The size of the torque sensing piston 157 is such that under normal constant speed or ordinary acceleration conditions on level ground the force exerted by the piston is insufficient to move the spring seat member 159 so that the compressive force exerted in the compression spring 77 remains uneffected by the torque sensing means. However, when the pressure in the manifold 62 increases to an abnormal value due to a sudden increase in engine power or a sudden increase in the load encountered by the road wheels such as when starting to travel up an incline, the torque sensing piston 157 will move the member 159 to the left against the bias of the spring 77, or directly against the force exerted by the biasing mechanism 78 when the stop portions 81 and 160 are abutting, to cause the spool to move to the left or to prevent the spool from moving farther to the right in response to an increase in pump speed which would ordinarily shift the spool.

In operation of the embodiment of the hydraulic power system of the FIG. 1 thus far described, operation of the vehicle engine causes rotation of the pumps P–1, P–2, and P–3 at a speed either equal to or directly proportional to the speed of rotation of the engine, depending upon whether or not a geared drive or direct drive is utilized. When the vehicle engine operates at a normal idle speed, the governor valve spool 76 will occupy the position shown in FIG. 1 since the pressure drop across the orifice 110 is insufficient to move the governor spool against the bias of the compression spring 77 through the differential biasing mechanism 78. Therefore, the pressure loadable bushings of both of the pumps P–1 and P–2 are unloaded through the governor valve grooves 84 and 86 so that only a relatively small fluid pressure will exist in the manifold 62. Hence, if the selector valve spool 126 is moved to position "F," the relatively small fluid pressure communicated to the passage 138 will be insufficient to operate the fluid motor M due to friction of the mechanical parts and the static resistance of the vehicle.

With the selector valve spool 126 in the position "F," if the vehicle accelerator (not shown) is depressed to increase the engine power and to increase the speed of rotation of the engine and the pumps, the increased speed of rotation of the pilot pump P–3 will increase the fluid flow through the orifice 110 to increase the pressure drop therethrough and to increase the pressure differential across the diaphragm 99 to shift the governor spool 76 against the bias of the compression spring 77 to the first speed position shown in FIG. 2. In this position the bushings of the pump P–2 are still unloaded through the groove 84, but the land 87 now blocks the port 93 to prevent bleeding of the pressure loading chamber 55 of the pump P–1 to cause the pressure therein to build up and to load the movable bushings 56 and 57, so that the pump P–1 will now transmit a pressure fluid flow to the manifold 62 in accordance with the speed of rotation of the vehicle engine and the pump P–1. The check valve 64 of the pump P–2 will now close to prevent back flow from the manifold 62 into the passage 60. The pressure fluid generated by the pump P–1 will pass from the manifold 62 through the groove 130 of the selector valve 122 into the passage 138 to cause rotation of the hydraulic motor M in forward direction at a speed directly proportional to the speed of rotation of the pump P–1, neglecting any leakage. The fluid exhausted from the motor M will pass through the duct 139 back to the sump through the ports 137 and 141 of the selector valve 122. Hence, the vehicle will move at a speed substantially directly proportional to the speed of operation of the vehicle engine, and since the pump P–1 is of relatively small displacement, a fairly low speed ratio will result to supply substantial torque for starting the vehicle in motion.

It will be understood that the relationship between the displacement of the pilot pump P–3, the size of the orifice 110, the effective area of the diaphragm assembly 99, and the size of the spring 77 is such that the vehicle engine speed will reach a sufficient value before the bushings of the pump P–1 are pressure loaded so that no engine stalling occurs. Furthermore, the loading of the bushings of the pump P–1 occurs over a finite period of time as the governor spool land 87 closes the port 93 so that a smooth start will be provided. If necessary, the configuration of the port 93 can be changed to change the characteristics of the initiation of the pressure loading of the bushings so as to change the starting characteristics of the vehicle.

If an abnormal amount of accelerator depression is utilized during acceleration, the engine torque will increase to an abnormal amount to increase the pressure in the manifold 62. Such an increase in engine torque will tend to accelerate the engine at an increased rate which would normally move the governor spool 76 farther to the right by means of increase in speed of the pilot pump P–3. However, due to the abnormal torque and the abnormal pressure in the manifold 62, the torque responsive piston 157 will move the spring seat member 159 against the bias of the compression spring 77 to increase the compressive force exerted by this spring to prevent further shifting of the governor spool 76 until the torque is reduced or the engine speed is commensurately increased to overcome the increased bias of the governor spring. Thus, a high torque is available for a high rate of acceleration or for overcoming abnormal loads even though a substantial engine speed has been reached which would normally tend to shift the governor spool 76 into a higher speed position.

At a predetermined vehicle engine speed as modified by the vehicle torque requirements, the differential pressure biasing mechanism 78 will move the governor spool 76 into the position shown in FIG. 3 against the bias of the governor spring 77. With the spool in this position the port 92 is blocked by the governor spool land 85 while the port 93 is referenced to the sump through the groove 88, and hence the bushings of the pump P–2 are now loaded while the bushings of the pump P–1 are unloaded. Therefore, the fluid motor M will be driven in substantially direct proportion to the pressure fluid output of the pump P–2. Since the pump P–2 is of a greater displacement than the pump P–1, the speed ratio between the drive wheels and the vehicle engine will be increased and the vehicle will operate at a higher road speed for a given engine speed. It will be understood that an abnormal increase in engine torque or an abnormal increase in torque requirements of the vehicle will cause a shift back into the first speed position shown in FIG. 2 due to the operation of the torque responsive piston 157.

At a predetermined higher vehicle engine speed, as modified by the vehicle torque requirements, the differential pressure biasing mechanism 78 will shift the governor spool 76 to its extreme right hand or third speed position as shown in FIG. 4. In this position, the port 92 is still blocked by the governor land 85 while port 93 is now blocked by the land 89 so that the pressure loadable bushings of both of the pumps P–1 and P–2 are loaded and both pumps are transmitting pressure fluid to the manifold 62 and the fluid motor M to drive the motor at a higher speed ratio or at substantially a direct drive with respect to the speed of rotation of the vehicle engine resulting in a higher vehicle speed for a given engine speed. Upon a sudden increase in vehicle torque requirements such as would be imposed by reaching a substantial incline or upon a substantial increase in engine torque by a depression of the accelerator, the torque responsive piston 157 will act to shift the governor spool 76 to the second speed position or even to the first speed position, depending upon the torque.

Since it is desirable under ordinary operating conditions to have the vehicle operating in high speed ratio at a relatively low engine speed, for example, 1000 r.p.m., for economy reasons, the relief valve 115 is designed to open when the pressure drop across the orifice 110 is just sufficient to move the governor spool 76 to its third speed position through the differential pressure biasing mechanism 78 under normal torque conditions when the torque sensing piston 157 has not shifted from its normal inoperative position. Since the vehicle engine may operate in high speed ratio at values of 2400 r.p.m. or greater, power losses due to flow through the orifice 110 would become substantial, and prohibitive pressures would be exerted in the ducts 106 and 107 and the first pressure chamber 100 if it were not for the provision of the relief valve 150 to by-pass the flow from the pilot pump P-3 at a predetermined engine speed. At engine speeds over 1000 r.p.m., for example, the force exerted by biasing mechanism 78 remains substantially constant and the position of governor spool 76 will be responsive to torque requirements only, as evidenced by the pressure in the manifold 62.

Four factors are important in shaping the operational characteristics of the hydraulic transmission system of FIG. 1 and they are:
 (1) The effective area of the diaphragm 99,
 (2) The governor spring load and spring rate,
 (3) The diameter of the torque sensing piston 157, and
 (4) The pressure drop across the orifice 110.

It is important that the maximum force exerted by the biasing mechanism 78 be somewhat greater, for example, 20% greater, than the opposing load created by torque sensing piston 157 during normal level road conditions, so that only an abnormal pressure exerted against the piston 157 will overcome the diaphragm pressure force in order to move the governor spool back to a lower speed range regardless of vehicle speed. Hence, there will be no shuttling between various speed ranges during ordinary variations of vehicle speed, engine torque, and vehicle torque requirements.

The maximum pressure relief valve 144 does not open even under abnormal torque conditions so that the full engine output will be transmitted to fluid motor M. However, should the engine speed be increased when the selector valve 122 is in the neutral position blocking the ports 136 and 137, the valve 144 will open to prevent the generation of a dangerous pressure in the manifold 62.

The provisions of the torque sensing mechanism insures that no shuttling will occur between speed ranges when the vehicle requires an abnormal torque. Under such conditions, if the torque sensing mechanism were not provided, the slowdown in engine speed due to a sudden increase in torque requirements would cause a downshift of the governor valve which would decrease the load on the pump assembly due to the decrease in utilized pump displacement, which, in turn, would allow the engine to speed up to cause the pilot pump P-3 to again upshift the governor valve to increase the flow capacity of the pump assembly P which would again cause the engine to slowdown because of the increased torque requirements, and the cycle would be repeated. The torque sensing mechanism insures that the increase in torque requirements will cause a downshift of the governor valve or will prevent an upshift so that the vehicle operates in the lower speed ratio until the torque requirements are decreased enough in order that an increased pump capacity due to an upshift of the governor valve can be handled by the engine without exceeding the maximum engine output. Hence, the engine can be operated at full speed and full power in the lower speed ratios in order that the maximum possible torque can be transmitted to the vehicle drive wheels when needed.

The freewheeling inhibitor means C are provided for preventing free wheeling of the motor M and the vehicle when the vehicle is travelling in the forward direction and the power transmitted by the vehicle engine to the pump assembly P is suddenly cut off or diminished. In the present instance, such means comprise a choke valve 164 which is connected in the sump return conduit from the motor M when the motor is being operated in the forward direction, this corresponding to the conduit 139. The choke valve 164 comprises a housing or casing 165 which has a transverse passage 166 formed therethrough. The passage 166 is connected with the conduit 139 to form a part of the conduit. A longitudinal chamber 167 is formed in the casing 165 with the chamber 167 and the passage 166 intersecting at their central portions. A choke valve spool 168 is shiftably disposed in the chamber 167. The spool 168 has an elongated land 169 at one end portion and a reduced diameter land 170 at the other end portion thereby forming a groove 171 therebetween. The land 169 is slidably disposed in a portion 167a of the chamber 167 on one side of bore 166 while the land 170 is slidably disposed in a reduced diameter portion 167b of the chamber 167 on the opposite side of the bore 166. The land 169 is formed with a longitudinal open ended cavity 172 which contains a compression spring 174 acting between the end of the cavity and the closed end of the chamber portion 167a to resiliently urge the land 169 into blocking relation across the bore 166 to prevent or restrict the flow of fluid through the conduit 139. A vent port 175 is connected by conduit means (not shown) to the sump in order to prevent hydraulic blocking of the movement of the valve spool 168. Adjustable stop means, in the form of an adjustment bolt 176 threadably inserted through the end of the housing 165 and a jam nut 177, are provided in order to positively limit the closing action of the spool 168 in order that the operator may adjust for the amount of choke required.

It will be seen that during forward motion of the vehicle when the land 169 blocks or partially blocks the bore 166, a substantial amount of fluid pressure will be built up in the portion of the conduit 139 upstream of the valve 164 to retard or prevent free-wheeling of the fluid motor M when the vehicle accelerator is released.

For causing the valve 164 to open during normal operation, a passage 178 is provided between the central portion of the selector valve bore 125 and the end portion of the chamber 167b. With this arrangement, when the pump assembly P delivers pressure fluid to the selector valve 122, the pressure will be referenced to the chamber 167b to act on the end of the land 170 to move the choke valve spool 168 against the bias of the compression spring 174 to open the valve and to permit unrestricted flow through the conduit 139. As long as fluid pressure of any magnitude is present in the central portion of the selector valve 122, the choke valve 164 will be in the open position as shown in FIG. 5. However, if the vehicle accelerator is released while the vehicle is travelling in a forward direction, the tendency of the fluid motor M to free-wheel will immediately reduce the upstream fluid pressure to cause the choke valve 164 to move to restrict or prevent flow through the conduit 139 to prevent or substantially reduce the tendency of the vehicle to free-wheel.

Ordinarily, the tendency of the vehicle to free-wheel in reverse is not objectionable since the vehicle is not driven at high speeds in reverse. When the vehicle is operated in reverse, the choke valve 164 will be held opened in the same manner as when operating in forward, and, in addition, will be held opened by the pressure of the fluid in the passage 166 due to the differential area between the inward ends of the lands 169 and 170.

The embodiment of the invention shown in FIG. 6 is particularly intended for use in a hydraulic power system utilizing an electric motor to drive a gear pump embodying pressure loadable bushings and is arranged to provide relatively low torque starting of the motor and pump. Heretofore in the design of electrically driven hydraulic pumps it was necessary to construct the electric motor for a torque rating capacity approximately 30 to 40 percent greater in order to insure cold starting of the hydraulic pump. As a result, in this older type of system the weight of the motor was considerably greater than that necessary to take care of normal running conditions of the pump.

In the embodiment of FIG. 6, a hydraulic power supply or pump assembly P' includes a large capacity pressure loading gear pump 181 connected for operating in parallel with a small capacity pressure loading gear pump 182 in a housing or casing 184. Low torque starting means S are arranged for causing unloading of the bushings of the large pump 181 until a predetermined output pressure, and normally a predetermined speed of rotation, of the small pump 182 has been reached in order that the starting load imposed on the driving motor is made considerably smaller. Pressure unloading means U are provided for overriding the pressure loading effect of the low torque starting means S to unload the bushings of the large pump 181 when a predetermined high pressure of the manifolded output of the pumps is reached. Maximum pressure relief means R' are provided in order to limit the maximum output pressure of the two pumps.

The gear pump 181 comprises a pair of meshing pump gears 185 (one shown) each having an axial hub 186 and an oppositely extending axial hub 187, with gear teeth 188 formed therebetween. Stationary pumping seal bushings 189 are disposed about the hub 186 while movable pumping seal bushings 190 are disposed about the hubs 187. Compression springs 191 are provided to urge the movable bushings 190 into an initial pumping seal against the side faces of the gear teeth 188. Interconnected substantially annular pressure loading chambers 192 are formed in the casing 188 opposite the sides of bushings flanges 194 which abut the gear teeth 188. The hub 187 of one of the gears 185 is elongated to provide a splined portion 195 extending out of the casing 184 and adapted for connecting to an electric motor (not shown) for driving pump. Bleed passage means (not shown) are provided for bleeding the pressure from the outlet side of the pump 181 to the pressure loading chamber 192, so that the pressure-urged sealing force exerted by the bushing 190, and consequently exerted in reaction by the stationary bushings 189, will vary with the output pressure of the pump as explained in detail in the previously cited Lauck et al. patent.

The smaller capacity pump 182 comprises a pair of meshing pumping gears 196 (one shown) having gear teeth 197 and oppositely extending hubs 198 and 199. Stationary pumping seal bushings 200 are disposed about the hubs 199 while movable pumping seal bushings 201 are disposed about hubs 198. Compression springs 202 are provided for urging the movable bushings 201 into an initial pumping seal with the side faces of the gear teeth 197. Interconnected annular pressure loading chambers 204 are formed in the casing 184 opposite the faces of bushing flanges 205 which abut the gear teeth 197. One of the hubs 199 is connected by means of a splined connection 206 with the hub 186 of one of the gears 185 of the pump 181 so that the two pumps are driven by a common drive. Bleed passage means (not shown) are provided for bleeding the output pressure of the pump 182 to the pressure loading chambers 204 to provide for pressure loaded operation of the bushings.

Fluid such as hydraulic oil is supplied to the two pumps through an inlet conduit 207 leading from a reservoir or a sump (not shown) and communicating with an inlet port 208 of the pump 181 and an inlet port 209 of the pump 182. Pressure fluid delivered by both pumps is delivered to an outlet manifold conduit 210 from an outlet port 211 of the pump 181 and an outlet port 212 of the pump 182.

Between the outlet port 211 of the pump 181 and the manifold 210 is disposed a check valve 214 which is arranged to allow flow into the manifold 210 but to prevent back-flow. The check valve 214 comprises a shiftable member 215 slidably disposed in an enlarged bore 216 to provide a shoulder 217 forming a valve seat for the member 215. The member 215 is provided with a frusto-conical end portion 218 which cooperates with the valve seat 217 to close the port 211 under the influence of a lightly loaded compression spring 219. The compression spring 219 acts between the end of a cavity 220 formed in the member 215 and a washer 221 fixedly disposed at the end of the chamber 216 opposite to the valve seat 217. Longitudinal flutes or passages 222 are formed about the outer periphery of the member 215 to permit fluid to flow past the member when it has been unseated by the formation of pressure in the outlet port 211.

A check valve 224 is provided between the outlet port 212 of the pump 182 and the manifold 210 in order to allow flow into the manifold but to prevent back-flow toward the pump. This valve may comprise a movable valve member 225 adapted for cooperating with a valve seat 226 to close the port 212 under the influence of a compression spring 227. The compression spring has one end seated against the valve member 25 and its other end seated against a fixedly disposed washer 228.

For limiting the maximum operating pressure of the large capacity pump 181 to limit the maximum amount of powder required to drive the pump assembly P', the pressure unloading means U are embodied in a pressure unloading valve 229. The valve 229 comprises an unloading valve spool 230 which has a land portion 231 at its upper end slidably disposed in a bore 232 which is formed in a casing portion 234 and which may constitute part of the pump assembly casing 184. A frusto-conical valve portion 235 is formed at the lower end of the valve spool 230 to form a groove 236 between the valve portion and the land 231. The frusto-conical surface of the valve portion 235 cooperates with a valve seat 237 provided by a shoulder formed at the juncture of the bore 232 and a coaxial, larger diameter bore 238. A compression spring 239 acts between the lower surface of the valve portion 235 and a plug 240 to urge the valve spool 230 to closed position. It will be noted that the plug 240 is threadably inserted in the bore 238 and provides means for adjusting the compression exerted by the spring 239 for adjusting the opening characteristics of the valve. The portion of the bore 232 above the land 231 is connected to the manifold 210 by means of a passage 241, and the portion of the bore 232 between the land 231 and the valve portion 235 is connected to the pressure loading chambers 192 of the pump 181 by means of a passage 242. The bore 238 is connected to the reservoir or sump (not shown) by means of conduit 244.

In order to prevent the generation of an excessive pressure in the manifold 210, the maximum pressure relief means R', in the form of a relief valve 245, are provided. The pressure relief valve 245 is similar in operation and construction to the pressure relief valve 144 of FIG. 1 and comprises a valve spool 246 having a land 247 slidably disposed in a dash pot 248 and a frusto-conical valve portion 249 formed at its lower end. A groove 250 is provided between the land 247 and the valve portion 249. A valve seat 251 is formed between a port 252 and a larger diameter bore 254, and the frusto-conical surface of the portion 249 cooperates with the valve seat 251 for closing the valve under the influence of a compression spring 255. The compression spring 255 acts between the lower surface of the valve portion 249 and a threaded plug 256 threadably inserted in the lower portion of the bore 254. The plug 256 provides means for adjusting the compression of spring 255 and hence, for adjusting the pressure at which the valve 245 will open. It will be noted that a restricted clearance 257 is provided between the land 247 and the side of the dash pot 248 in order to prevent chattering of the relief valve. The bore 254 is vented to the sump by means of a passage 258 which is connected between the bore and the conduit 244.

According to this invention control means for controlling pressure loading of the bushings of the pump 181 are provided in the form of the low torque starting means S which include a low torque starting valve 259. The valve 259 comprises a valve spool 260 shiftably disposed in a chamber 261 formed in a casing portion 262 which may constitute part of the pump assembly casing 184. The valve spool 260 has a land portion 264 slidably disposed in an upper portion 261a of the chamber 261. Immediately below the land 264 is formed a valve portion 265 having a frusto-conical lower end surface 266 which is adapted to cooperate with a valve seat 267 formed at the juncture of the chamber portion 261a and a reduced diameter chamber portion 261b. A groove 268 is formed between the lower end of the valve portion 265 and a reduced diameter land 269 formed at the lower end of the valve spool 260 and slidably disposed in reduced diameter chamber 261b. A compression spring 270 acts between the lower end of the valve spool 260 and the bottom of chamber portion 261b to urge the valve spool upwardly away from the valve seat 267 to engage a stop 271 against the upper end of the chamber portion 261a. The passage 242 to the bore 232 of the unloading valve 229 passes through the upper portion of the chamber 261b of the low torque starting valve 259. In order to connect the lower portion of the chamber 261a with the sump, a passage 272 is connected to the chamber portion 261a below the land 264, and is connected by a passage 274 to the sump, through the bore 238 and the conduit 244. For preventing hydraulic blocking of movement of the valve spool 260 a conduit 275 connects the lower portion of the chamber 261b with the passage 274, and hence with the sump.

Acting in conjunction with the low torque starting valve 259, means are provided to cause pressure loading of the bushings of the pump 181 after a predetermined output pressure of the pump 182 and consequently, normally, a predetermined speed of rotation of the pump has been reached. In the present instance, such means comprise a restriction or orifice 276 formed in the pump casing 184 between the outlet port 212 of the pump 182 and the check valve 224, in conjunction with a passage 277 communicating between the outlet port 212 and the portion of the chamber 261a of the low-torque starting valve 269 above the land 264. It will be seen that rotation of the pump 182 will cause a fluid flow through the orifice 276 to cause a pressure rise in the output port 212, and when the pressure in the output port has reached a predetermined value, the valve spool 260 of the low torque starting valve will be urged downwardly to seat the surface 266 against the seat 267 to close the valve and to allow pressure loading of the bushings of the pump 181 so that this pump will begin to supply substantial pressure along with the pump 182.

In operation with the hydraulic power system embodiment of FIG. 6, upon starting rotation of the pump assembly P' the pressure in the output port 212 of the small pump 182 is at a relatively low value so that the low torque starting valve 259 is in the position shown in FIG. 6 and the pressure behind bushings of the pump 181 is relieved through the portion of the passage 242 upstream of the valve 259, through the upper portion of the chamber 261b, into the lower portion of the chamber 261a, and to the reservoir through the passages 272 and 274 and the conduit 244. Normally, after a predetermined speed of rotation of the pump 182 has been reached, the fluid flow from the pump will reach a value sufficient to cause enough pressure drop through the orifice 276 to force the valve spool 260 of the low torque starting valve downwardly to close the valve and to prevent communication between the passage 242 and the passage 272. As a result, the heretofore nominal output pressure of the pump 181 will cause pressure loading of the pump bushings to provide a pumping seal so that the pump 181 will deliver pressure fluid to the manifold 210 in conjunction with the pressure fluid supplied by the smaller pump 182. The pressure fluid supplied to the manifold 210 is conducted to a pressure utilization means (not shown) which will be operated thereby. If the pressure utilization means is subjected to an abnormal load, the pressure in the manifold 210 will increase to a value such that the force exerted by this pressure on the upper face of the land 231 of the unloading valve 229 will be sufficient to overcome the force exerted by the compression spring 239, so that the passage 242 will be put into communication with the reservoir conduit 244, and hence the bushings of the pump 181 will be unloaded to prevent the generation of substantial pressure by this pump until the fluid pressure in the manifold 210 has decreased to a value below the unloading pressure of the valve 229.

If the load on the utilization means should be of such a magnitude that the pressure in the manifold content continues to rise due to the operation of the pump 182, at a predetermined high value, the relief valve 245 will open to prevent a further increase in the manifold pressure.

In a hydraulic power system arrangement as illustrated in FIG. 6, it has been found that the governing action of the low torque starting valve reduces the required motor power rating in a typical installation from 21 to 15 horsepower which results in a motor weight saving of approximately 12 lbs. It is readily apparent that such a power and weight saving is very important when this embodiment of the system is utilized in connection with an aircraft hydraulic system or fuel system.

While in the two embodiments of the invention just described the pumps have been shown and described as having different sizes and capacities, it should be obvious that pumps of the same size and capacity may be used, depending on the speed ratio changes desired and the output and pressure requirements of the system.

Figure 7:
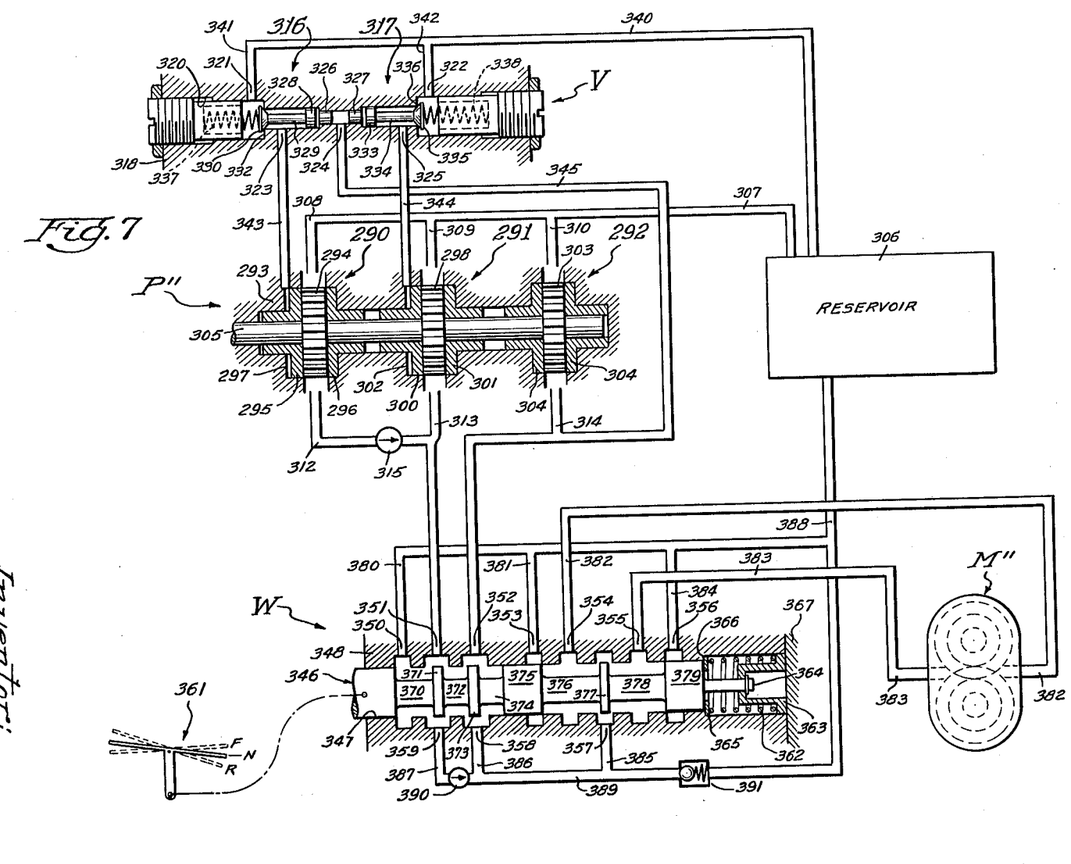

Turning now to the embodiment of the invention shown in FIG. 7, the torque response hydraulic system comprises generally a hydraulic power supply or pump assembly P'', a control or unloading valve means V, a selector valve means W and pressure utilization means in the form of a hydraulic motor M''.

The power supply or pump assembly P'' comprises a first pump 290 with pressure loadable bushings connected in parallel with a second pump 291 with pressure loadable bushings, the two pumps having the same size or capacity, or different sizes or capacities, as desired, depending on the particular environmental use. The displacement of the power supply assembly is controlled by a fixed clearance pilot or control pump 292 in accordance with the torque requirements of the system, the pump 292 being arranged to be driven at a fixed ratio with respect to the pumps 290 and 291. The pump 292 may be of the same size or capacity as the pumps 290 and 291, or may be of a different size or capacity. The pressure fluid output of the power supply assembly P'' is manifolded and conducted through the motor M'' in a direction controlled by the position of the valve means W in order to effect either forward or reverse drive of the motor M'' and a subsequent forward or reverse drive of a driven utilization mechanism (not shown), to which the motor is connected.

In any initial drive position of the valve means W, the bushings of the pumps 290 and 291 are pressure loaded, so that the entire fluid output or displacement from the power system P″ is conducted to the motor M″. As the torque requirements of the system increase, as when a relatively heavy load is encountered, higher fluid pressures are required by the system so as to drive the motor M″. The pilot or control pump 292 as its fluid pressure increases cooperates with the valve means V, in a manner to be more fully explained, to cause successive unloading of the bushings of the pumps 290 and 291, thereby decreasing the displacement or fluid output of the system with a resultant decrease in the speed of rotation of the motor M″.

In this embodiment of the invention, the hydraulic power supply or pump assembly includes a housing or casing 293 containing the pumps 290, 291 and 292. The pumps are all coupled for a common drive, but it will be readily apparent that any fixed ratio drive may be provided between the pumps by means of gears (not shown). The pumps 290 and 291 are of the pressure loadable type shown and described in the aforementioned Lauck et al. Patent No. 2,420,622, while the pump 292 is of the fixed clearance variety.

The pump 290 is provided with intermeshing driving and driven gears 294, 294 (the driving gear being shown), and each gear, as in the aforementioned Lauck et al. patent is provided with a pair of axially extending hubs about which are disposed in closely conforming relation an axially movable pumping seal bushing 295 and a stationary pumping seal bushing 296, respectively. The pump bushings are conducted to provide a pumping seal with the adjacent gear side faces, and the movable bushings are resiliently urged against the adjacent gear side faces by means of lightly loaded compression springs (not shown) in order to provide an initial pumping seal with the gear side faces. The axially movable bushings 295 define, with the housing 293, generally annular communicating pressure chambers 297, 297, which pressure chambers are in communication with the outlet side of the gears, so as to allow a flow of pressure fluid therefrom to load the bushings and urge them into the pumping seal relation. The specific communicating means and the manner in which the bushings are urged into sealing relation are fully disclosed in the aforementioned Lauck et al. patent.

In a similar manner, the pump 291 is provided with intermeshing driving and driven gears 298, 298, each of which is provided with a pair of axially extending hubs about which are disposed in closely conforming relation an axially movable pumping seal bushing 300 and a stationary pumping seal bushing 301, respectively. As in the case of the pump 290, lightly loaded compression springs are provided to initially load the bushings, and the axially movable bushings 300 define with the casing 293, pressure loading chambers 302, 302 in communication with the outlet side of the gears.

The pump 292 comprises intermeshing driving and driven gears 303, 303 engageable by fixed pump bushings 304, 304. The driven gear of each of the three described pumps is suitably rotatably connected to a common drive shaft 305 passing through the housing 293 and adapted to be suitably connected to a source of power (not shown).

The pumps 290, 291 and 292 are supplied with fluid, such as hydraulic oil, from a reservoir or sump 306 by means of a conduit 307 and branch conduits 308, 309 and 310 leading to the inlets of the respective pumps. The pumps discharge into conduits 312, 313 and 314 connected to the respective outlets of the pumps. The conduit 312 is connected to the conduit 313 and has therein a conventional one-way check valve 315 to prevent the flow of fluid from the pump 291 to the pump 290.

The control or unloading valve means V comprises a pair of normally closed spool valve members 316 and 317 operatively associated with the pumping assembly P″. The valve members are received in a housing or casing portion 318 having a continuous bore 320 therethrough, the bore having portions of successively decreasing and successively increasing diameters from end to end, as illustrated. Ports 321, 322, 323, 324 and 325 are formed in the housing portion 318 and communicate with the bore 320. Also, plungers 326 and 327 are received in a central portion of the bore 320 and are associated with the valve members 316 and 317, respectively.

The valve member 316 comprises a land 328, groove 329 and a frusto-conical valve proper 330 adapted to seat on a shoulder 332 defined by the juncture of two different diameter portions of the bore 320. Likewise, the valve member 317 comprises a land 333, a groove 334 and a frusto-conical valve proper 335 adapted to seat on a shoulder 336 defined by the juncture of two other different diameter portions of the bore 320. The plungers 326 and 327 are cylindrical and are positioned in spaced relation, and adjacent the lands 328 and 333, respectively.

Coiled compression springs 337 and 338 received in suitable spring retainers threadably received in the housing portion 318 are provided for urging the valves proper 330 and 335, respectively, into their seating positions, the spring 338 being heavier than the spring 337 and thereby exerting a greater force, for a purpose to be described.

The ports 321 and 322 are in communication with the reservoir or sump 306 by means of a conduit 340 and the branch conduits 341 and 342, respectively. The port 323 is in communication with the loading chambers 297 of the pump 290 by means of a conduit 343, and the port 325 is in communication with the loading chambers 302 of the pump 291 by means of a conduit 344. The port 324 is in comunication with the outlet conduit 314 of the pump 292 by means of a conduit 345.

The selector valve means W comprises a valve member 346 slidably received in a bore 347 formed in a housing or casing portion 348 provided with ports 350, 351, 352, 353, 354, 355, 356, 357, 358 and 359. The valve member 346 is movable between various positions, corresponding to forward, reverse and neutral drives by means of a linkage generally indicated at 361 and is resiliently urged or returned to its neutral position, as illustrated, by means of a coil spring 362 suitably supported on a movable spring retainer 363 connected to an extending portion 364 of the valve member 346 and acting against a washer 365 adapted to abut a shoulder 366 in the bore 347, at one end, and a flanged portion of the retainer 363, at its other end. A closure element 367 fixedly attached to the housing 348 retains the retainer, spring and washer in their assembled relationship. When the valve member 346 is moved toward the left, as by moving the linkage 361 to its "R" position, the spring retainer 363 will also move toward the left, thereby compressing the spring 362, so that upon release of the linkage 361, the spring 362 urges the valve member 346 to its illustrated position. Likewise, when the valve member 346 is moved toward the right, as by moving the linkage 361 to its "F" position, the valve member 346 will act against the washer 365, whereby moving the washer and compressing the spring 362, so that upon release of the linkage 361, the spring 362 urges the valve member 346 to its illustrated position. It is thus obvious that to retain the valve member 346 in either its "F" or "R" positions, it is necessary to hold the linkage 361 in its corresponding position.

The valve member 346 comprises a groove 370, a land 371, a groove 372, a land 373, a groove 374, a land 375, a groove 376, a land 377, a groove 378, a land 379 and the portion 364. The lands are all constructed to have a diameter substantially equal to the diameter of the bore 347.

The port 350 is connected to a conduit 380; the port 351 is connected to the conduit 313; the port 352 is connected to the conduit 345; the port 353 is connected to a conduit 381; the port 354 is connected to a conduit 382; the port 355 is connected to a conduit 383; the port 356 is connected to a conduit 384; the port 357 is connected to a conduit 385; the port 358 is connected to a conduit 386; and the port 359 is connected to a conduit 387. The conduits 380, 381 and 384 are connected to a conduit 388, which in turn is connected to the reservoir or sump 306. The conduit 383 is connected to one side of the fluid motor M″, and the conduit 382 is connected to the other side of the fluid motor M″. The conduits 385, 386 and 387 are connected to a conduit 389. A conventional one-way check valve 390 is provided in the conduit 389 between the junctures of the conduits 386 and 387 to prevent the flow of fluid from the conduit 386 to the conduit 387. A conventional spring urged ball relief valve 391 is disposed between the conduits 388 and 389 for the relief of excessive pressure, as will be described.

The fluid motor M″ comprises a conventional intermeshing gear motor having inlet and outlet sides depending upon the direction of flow of the fluid thereto and therefrom. Further description therefore is deemed unnecessary.

As previously mentioned, the selector valve means W is illustrated in its neutral position. Movement of the linkage means 361 by the operator of the vehicle in which the power system is installed allows the valve member 346 to be positioned in forward (identified by "F") or reverse (identified by "R") drive of the motor M″ with a resultant forward or reverse drive to the driven mechanism (not shown).

Assuming that the drive shaft 305 upon which the driving gears of the pumps are mounted is rotated, the pumps will be operating and will be pumping fluid from their inlets to their outlets. With the valve member 346 in its neutral, illustrated, position, the bushings 295 and 300 of the pumps 290 and 291, respectively, will be initially loaded by the previously mentioned compression springs. Fluid from the reservoir or sump 306 will be supplied through the conduit 307 and the branch conduits 308, 309 and 310 to the respective inlets of the pumps 290, 291 and 292, and will be discharged from the respective pump outlets into the conduits 312, 313 and 314. Fluid from the conduit 313 (to which the conduit 312 is connected) and 314 (connected to the conduit 345) will flow into the ports 351 and 352 of the valve means W, into the bore 347, around the lands 371 and 373 and the grooves 370, 372 and 374, being confined from further flow in the bore 347 by the land 375, and to the ports 350, 358 and 359. From the latter ports, the fluid will flow through the conduit 380 into the conduit 388 and back to the reservoir or sump 306. Under these conditions, there is no flow through the conduits 382 or 383 to the motor M″.

During this time, fluid pressure at the outlets of the pumps 290 and 291 will be conducted to the pressure loading chambers 297 and 302, respectively, to urge the bushings 275 and 300, respectively, into pumping seal relation with the adjacent gear side faces. Fluid in the pressure loading chambers 297 and 302 will also flow into the conduits 343 and 344, respectively, and to the ports 323 and 325. Since the valve elements 316 and 317 are urged to their positions illustrated, the fluid from the pressure loading chambers is merely confined between the respective land and valve proper portions of the valve members. Also, fluid will be flowing through the conduit 345 and into the port 324 to act on the faces of the piston members 326 and 327. Since the load on the system under these conditions is zero, the pressure acting on the plungers will be insufficient to move the plungers and thereby the valve members 316 and 317 against the forces exerted by the springs 337 and 338, respectively. Therefore, any pressure fluid in the pressure loading chambers will act to urge the bushings into their sealing relation.

When the linkage means 361 is moved to its "F" or forward drive position, the valve member 346 will be moved toward the left, as viewed in the drawing, so that the fluid flowing into the ports 351 and 352 will then flow to the ports 358 and 359, into the conduit 389 into the conduit 385 to the port 357, around the groove 378, to the port 355 and into the conduit 383 leading to the inlet (under this condition) of the motor M″. Fluid from the motor will flow into the conduit 382, to the port 354, around the groove 376, to the port 353, into the conduit 381, and into the conduit 388 back to the reservoir or sump 306. The relief valve 391 effectively prevents the discharge of fluid under pressure to the reservoir or sump 306 until the pressure thereof is at and above a predetermined value as determined by the spring element of the relief valve.

Under light load conditions of the motor M″, the pressure loading of the pump bushings and the nonaction of the control or unloading valve V are the same as previously described when the neutral condition exists. However, as the load on the motor is increased, the pressure of the fluid is increased, and when the pressure of the fluid from the pump 292 reaches a predetermined value, it becomes sufficient to move the plunger 326 to the left (as illustrated in the drawing) with a resultant unseating of the valve proper 330 of the valve member 316. Under these conditions, the fluid from the pressure chambers 297 of the pump 290 will flow from the port 323 around the groove 329, to the port 321, into the conduit 341, into the conduit 340 and back to the sump. Thus, the bushings 295 of the pump 290 will be unloaded to allow them to move away from the gear side faces. This effectively removes the pump 290 from the supplying of fluid pressure to the motor M″ and results in a decrease in speed of the motor. Fluid under pressure discharged from the pump 291 is prevented from flowing to a zone of lower pressure in the pump 290 by means of the one-way valve 315, previously mentioned. Therefore, the motor is in an intermediate speed drive, but its torque output is increased.

As the load on the motor increases still more, the pressure discharged from the pump 292 is increased resulting in an increased pressure flowing into the conduit 345 and acting upon the plungers 326 and 327. The plunger 326, as previously described, has moved the valve member 316 to its unloading position. Under the increased load condition, the plunger 327 will be moved to the right (as illustrated in the drawing), and will cause the unseating of the valve proper 338 of the valve member 317 urged to seating position by the force of the stronger spring 338. Therefore, the fluid in the pressure chamber 302 of the pump 291 will flow through the port 325 around the groove 334, to the port 322, into the conduit 342, to the conduit 340 and back to the reservoir or sump 306. This allows the bushings 300 of the pump 291 to move away from their pumping seal positions, and effectively removes the pump 291 from supplying fluid pressure to the motor. High pressure fluid from the pump 292 is prevented from flowing to a zone of low pressure by means of a one-way valve 390. Thus, the motor M″ is in a low speed condition obtaining its entire source of fluid under pressure from the fixed clearance pump 292, but with an increase in torque.

Upon successive decreases in the torque requirements of the motor M″, as when the load thereon is decreased, the control or unloading valve V will act in a reverse manner to that described and allow the successive loading of the bushings of the pumps 291 and 290, thereby returning the pumps 291 and 290 to their pressure supplying conditions.

To reverse the direction of rotation of the motor M″, it is only necessary to move the linkage means 361 to its "R" position, which in turn moves the valve member 346 of the selector valve W to the right, as illustrated in the drawings. The flow of fluid to the port 357 is the same as that when the valve member 346 is in its "F" position. However, from the port 357 the fluid will flow around the groove 376, to the port 354, to the conduit 382 and to the other side of the motor M″. Fluid will be discharged from the opposite side of the motor through the conduit 383, the port 355, the groove 378, the port 356, the conduit 384, and the conduit 388 to the reservoir or sump 306. In the reverse drive condition the loading and successive unloading of the bushings of the pumps 290 and 291 as controlled by the unloading valve V and the pump 292 will be the same as that described with reference to the "F" or forward drive condition of the system. Therefore, further description would be a mere repetition and is deemed unnecessary.

From the above description it will be readily understood that the present invention provides two embodiments of an improved hydraulic power system in both of which embodiments the control of operation of a pressure loaded pump or pumps is substantially improved by provision of governing or control means to correlate the pressure loading of the bushings of the pump with the speed of operation thereof. In both of the embodiments, means are provided to coact with and complement the action of the governing or control means to lower the output capacity of the hydraulic power supply when the output pressure tends to exceed a predetermined range.

Also, it will be readily understood that the present invention provides a third embodiment of an improved hydraulic power system in which the control of operation of a pressure loaded pump or pumps is substantially improved by provision of control or unloading means to correlate the pressure loading of the bushings of the pump or pumps with the torque requirements of the system.

It will be understood that modifications and variations may be effected without departing from the scope of the novel concepts of the present invention.

This application is a continuation-in-part of my copending application, Serial No. 289,930, filed May 24, 1952, now abandoned.

I claim:

1. In a system for supplying pressure fluid to a utilization mechanism, a pump assembly including a first intermeshing gear pump having a low pressure liquid inlet and a high pressure liquid outlet, said pump including axially adjustable end plates, means directing the output pressure of said pump to the back faces of said end plates for pressure loading the same, control valve means, first conduit means in fluid communication with the back face of said end plates and said control valve means, a second gear pump coupled to and driven with said first gear pump and having an inlet and an outlet, second conduit means communicating the output fluid of said second pump with said control valve means to urge said control valve means to a position tending to close said control valve means to confine the pressure applied to said pump bushings to pressure load the same, third conduit means communicating the output fluid of said first pump with said control valve means to urge said control valve means to a position to open said valve control valve means to relieve the pressure applied to said pump bushings to unload the same when the output of said first pump reaches a predetermined value, and fourth conduit means for conducting the output fluid of said first pump to a utilization mechanism.

2. In a system for supplying pressure fluid to a utilization mechanism, a pump assembly including first and second intermeshing gear pumps each having low pressure liquid inlets and high pressure liquid outlets, said outlets being connected to a common manifold having an outlet, said pumps including axially adjustable end plates, means directing the output pressure of each of said pumps to the back faces of said end plates for pressure loading the same, control valve means, first separate conduit means in fluid communication with the back face of said end plates of each of said pumps and said control valve means, a third gear pump coupled to and driven with said first and second gear pumps, and having an inlet and an outlet, said control valve means having a first position opening both of said first conduit means and a second position closing only one of said first conduit means, second conduit means communicating the output fluid of said third pump with said control valve means to urge said control valve means to a position tending to move said control valve means to its second position to confine the pressure applied to the pump bushings of said first gear pump to pressure load the same when the output of said third pump reaches a first predetermined value, third conduit means communicating the output fluid of said first and second pumps with said control valve means to urge said control valve means to its first position to open said valve means to relieve the pressure applied to the pump bushings of both first and second gear pumps when the output of said first and second gear pumps reaches a second predetermined value, and fourth conduit means for conducting the outlet of said manifold to a utilization mechanism.

References Cited in the file of this patent

UNITED STATES PATENTS

| | | |
|---|---|---|
| 1,580,433 | Holdsworth | Apr. 13, 1926 |
| 1,606,060 | Cox | Nov. 9, 1926 |
| 1,877,091 | Vickers | Sept. 13, 1932 |
| 1,905,933 | Fourness | Apr. 25, 1933 |
| 1,922,092 | Hull | Aug. 15, 1933 |
| 2,020,987 | Ayres | Nov. 12, 1935 |
| 2,105,999 | Evans | Jan. 18, 1938 |
| 2,107,152 | Huber | Feb. 1, 1938 |
| 2,113,691 | Heller | Apr. 12, 1938 |
| 2,115,546 | Aikman | Apr. 26, 1938 |
| 2,274,337 | Ritter | Feb. 24, 1942 |
| 2,412,588 | Lauck | Dec. 17, 1946 |
| 2,433,954 | Lapsley | Jan. 6, 1948 |
| 2,437,791 | Roth et al. | Mar. 16, 1948 |
| 2,505,191 | Lauck | Apr. 25, 1950 |
| 2,512,025 | Lauck | June 20, 1950 |
| 2,627,232 | Lauck | Feb. 3, 1953 |
| 2,642,802 | Gardiner | June 23, 1953 |
| 2,654,325 | Minshall | Oct. 6, 1953 |
| 2,655,111 | Schanzlin | Oct. 13, 1953 |
| 2,660,985 | Ernst | Dec. 1, 1953 |
| 2,696,172 | Compton | Dec. 7, 1954 |
| 2,737,929 | Adams | Mar. 13, 1956 |
| 2,742,862 | Banker | Apr. 24, 1956 |
| 2,759,423 | Keel | Aug. 21, 1956 |
| 2,762,305 | Huber et al. | Sept. 11, 1956 |
| 2,768,582 | Klessig et al. | Oct. 30, 1956 |
| 2,769,394 | Lauck | Nov. 6, 1956 |
| 2,845,868 | Norlin | Aug. 5, 1958 |